(12) United States Patent
Sapper et al.

(10) Patent No.: US 6,797,771 B2
(45) Date of Patent: Sep. 28, 2004

(54) AQUEOUS COMPOSITION THAT CAN BE HARDENED PHYSICALLY, THERMALLY OR THERMALLY AND WITH ACTINIC RADIATION AND THE DERIVATIVES AND PRODUCTION THEREOF

(75) Inventors: Ekkehard Sapper, Rimpar (DE); Anne Hupp, Kist (DE); Egon Wegner, Veitshöchheim (DE); Willi Vesper, Wiesentheid (DE); Karl-Heinz Josten, Veitshöhheim (DE); Jörg Schwarz, Georgsmarienhütte (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 10/181,135

(22) PCT Filed: Feb. 1, 2001

(86) PCT No.: PCT/EP01/01086
§ 371 (c)(1),
(2), (4) Date: Jul. 12, 2002

(87) PCT Pub. No.: WO01/57105
PCT Pub. Date: Aug. 9, 2001

(65) Prior Publication Data
US 2003/0100626 A1 May 29, 2003

(30) Foreign Application Priority Data
Feb. 2, 2000 (DE) .......................... 100 04 487

(51) Int. Cl.$^7$ .............................................. C08G 18/28
(52) U.S. Cl. ........................................ 524/728; 560/26
(58) Field of Search ................................. 524/728, 199; 560/26

(56) References Cited

U.S. PATENT DOCUMENTS

| | | | |
|---|---|---|---|
| 3,361,844 A | 1/1968 | Hoeschele et al. | 260/358 |
| 3,996,154 A | 12/1976 | Johnson et al. | 252/312 |
| 4,268,542 A | 5/1981 | Sakakibara et al. | 427/195 |
| 4,489,135 A | 12/1984 | Drexler et al. | 428/423.1 |
| 4,675,234 A | 6/1987 | Sachs et al. | 428/328 |
| 5,028,639 A | 7/1991 | Treutlein et al. | 523/200 |
| 5,169,719 A | 12/1992 | Balatan | 428/423.1 |
| 5,210,154 A | 5/1993 | Weidemeier et al. | 525/438 |
| 5,334,420 A | 8/1994 | Hartung et al. | 427/407.1 |
| 5,356,669 A | 10/1994 | Rehfuss et al. | 427/407.1 |
| 5,418,301 A | 5/1995 | Hult et al. | 525/437 |
| 5,425,970 A | 6/1995 | Lahrmann et al. | 427/493 |
| 5,474,811 A | 12/1995 | Rehfuss et al. | 427/407.1 |
| 5,486,384 A | 1/1996 | Bastian et al. | 427/493 |
| 5,516,559 A | 5/1996 | Röckrath et al. | 427/407.1 |
| 5,574,103 A | 11/1996 | Wu et al. | 525/127 |
| 5,605,965 A | 2/1997 | Rehfuss et al. | 525/100 |
| 5,691,419 A | 11/1997 | Engelke et al. | 525/208 |
| 5,691,425 A | 11/1997 | Klein et al. | 525/455 |
| 5,707,941 A | 1/1998 | Haberle | 528/44 |
| 5,716,678 A | 2/1998 | Röckrath et al. | 427/407.1 |
| 5,747,166 A | 5/1998 | Schwartz et al. | |
| 5,965,213 A | 10/1999 | Sacharski et al. | 427/475 |
| 6,001,424 A | 12/1999 | Lettmann et al. | 427/407.1 |
| 6,001,915 A | 12/1999 | Schwarte et al. | 524/457 |
| 6,162,506 A | 12/2000 | Lettmann et al. | 427/407.1 |

FOREIGN PATENT DOCUMENTS

| | | | |
|---|---|---|---|
| CA | 2033530 | 1/1991 | ......... C09D/175/04 |
| CA | 2108990 | 10/1993 | ......... C08G/81/02 |
| CA | 2102169 | 11/1993 | ......... C09D/133/00 |
| CA | 2170949 | 3/1996 | ......... C09D/175/08 |
| CA | 2216111 | 4/1996 | ......... C09D/5/03 |
| DE | 196 13 547 | 11/1996 | |
| DE | 19736535 | 8/1997 | |
| DE | 196 45761 | 5/1998 | |
| DE | 198 16 362 | 10/1999 | ......... C09C/1/30 |
| EP | 249 201 | 6/1987 | ......... C09D/3/58 |
| EP | 276 501 | 9/1987 | ......... C11D/1/42 |
| EP | 354 261 | 8/1988 | ......... C08G/18/50 |
| EP | 424 705 | 10/1990 | ......... C08F/283/00 |
| EP | 594 068 | 10/1993 | ......... C09D/210/02 |
| EP | 594 071 | 10/1993 | ......... C09D/201/02 |
| EP | 594 142 | 10/1993 | ......... C08L/57/12 |
| EP | 604 992 | 12/1993 | ......... C08K/5/3492 |
| EP | 731 148 | 2/1996 | ......... C09D/7/02 |
| GB | 1127338 | 6/1967 | ......... C07C/119/04 |
| GB | 1220717 | 9/1968 | ......... H01F/27/00 |
| WO | WO93/15849 | 8/1993 | ......... C09D/175/00 |
| WO | WO93/17060 | 9/1993 | ......... C08G/63/02 |
| WO | WO94/03511 | 2/1994 | ......... C98G/18/08 |
| WO | WO 94/03512 | 2/1994 | ......... C08G/18/08 |
| WO | WO 94/10211 | 5/1994 | ......... C08F/8/30 |
| WO | WO 94/10212 | 5/1994 | ......... C08F/8/30 |
| WO | WO 94/10213 | 5/1994 | ......... C08F/8/30 |
| WO | WO 94/22968 | 10/1994 | ......... C09D/133/06 |
| WO | WO95/03367 | 2/1995 | ......... C09D/175/04 |
| WO | WO 96/12754 | 5/1996 | ......... C08G/63/20 |
| WO | WO 97/12945 | 4/1997 | ......... C09D/5/04 |
| WO | WO 97/49745 | 12/1997 | ......... C08G/18/08 |
| WO | WO 97/49747 | 12/1997 | ......... C98G/18/75 |
| WO | 99/51692 | * 10/1999 | |

OTHER PUBLICATIONS

Advanced Materials, Bruce M. Novak, entitled "Hybrid nanocomposite materials—between inorganic glasses and organic polymers", 1993, pp. 422–433.

* cited by examiner

Primary Examiner—Rachel Gorr

(57) ABSTRACT

The invention concerns a novel aqueous composition that can be hardened physically, thermally and/or with actinic radiation, containing a compound of general formula (I): X[NH—C(=O)—NH—Y—NH—C(=O)—OR]2 having at least one urea and urethane group, wherein the variables have the following meaning: R represents identical or different polyalkylene glycol ether radicals; X represents a bivalent substituted or unsubstituted arylene radical; Y represents identical bivalent substituted or unsubstituted arylene radicals, which are the same as or different from radical X or different bivalent substituted or unsubstituted arylene radicals of which none or one is identical to radical X. The invention also concerns the utilization of said compound for the production of novel aqueous coating materials, adhesives and sealants that can be hardened physically, thermally or thermally and with actinic radiation and their derivatives.

21 Claims, No Drawings

AQUEOUS COMPOSITION THAT CAN BE HARDENED PHYSICALLY, THERMALLY OR THERMALLY AND WITH ACTINIC RADIATION AND THE DERIVATIVES AND PRODUCTION THEREOF

This application is a National Phase Application of Patent Application PCT/EP01/01086 filed on 01. Feb. 2001.

The present invention relates to novel aqueous compositions curable physically, thermally, or thermally and with actinic radiation, and comprising Theological aids based on urea urethanes. The present invention also relates to the use of the novel compositions to prepare novel aqueous coating materials, adhesives, and sealing compounds. The present invention additionally relates to novel processes for preparing novel aqueous coating materials, adhesives, and sealing compounds from aqueous or aqueous/organic compositions curable physically, thermally, or thermally and with actinic radiation and comprising rheological aids based on urea urethanes. The present invention further relates to novel coatings, adhesive films, and seals which are produced with the aid of the novel coating materials, adhesives, and sealing compounds and/or of the novel processes.

Thermally curable aqueous coating materials which comprise a crosslinking agent and an ionically and/or non-ionically stabilized polyurethane which is saturated, unsaturated, and/or grafted with olefinically unsaturated compounds and is based on aliphatic, cycloaliphatic, aliphatic-cycloaliphatic, aromatic, aliphatic-aromatic and/or cycloaliphatic-aromatic polyisocyanates, and also the corresponding coatings, are known, for example, from the patents EP-A-0 089 497, DE-C-197 22 862, and DE-A-196 45 761. They are normally referred to as aqueous basecoat materials. The special rheological properties required for the storage and application of these known aqueous basecoat materials, such as viscosity, pseudoplasticity and thixotropy, are formulated through the use of an inorganic phyllosilicate of the montmorillonite type. Its use is necessary in order to give the aqueous basecoat material its familiarly good performance properties such as, for example, good atomizability, stability, and, in the case of effect aqueous basecoat materials, an excellent metallic effect, i.e., a very highly pronounced flip-flop effect. Furthermore, in preparing the known aqueous basecoat materials it is necessary to insert a homogenization step following the addition of each constituent, so making production comparatively complex.

Unfortunately, the inorganic phyllosilicates are unable to impart the desired Theological properties reliably at all times and under all circumstances. For instance, it may happen that the originally formulated viscosity of the aqueous basecoat materials provided with these phyllosilicates falls sharply on storage or on use at the customer's premises, thereby reducing the stability and deleteriously altering the metallic effect, in particular, in the aqueous basecoats in question.

The causes of this phenomenon, which may cause great problems in practice, are not yet fully understood. It is assumed that the phenomenon is related to the mechanism of rheology buildup in the monomorillonite, by way of dipoles within its molecular structure. Extremely damaging effects are exerted here by ionic materials and by materials which have strong electrical fields, examples being trivalent ferric ions, which have a particularly small ionic radius. Ferric ions of this kind are introduced into the aqueous basecoat materials by way, for example, of pigments. Surfactants and molecules with strong dipoles may also manifest themselves in an adverse manner.

Other Theological aids, such as thickeners based on polyurethanes or polyacrylates (cf. Römpp Lexikon Lacke und Druckfarben, Georg Thieme Verlag, Stuttgart, N.Y., "thickeners", pages 599 to 600), do not have these disadvantages. On the other hand, however, they have other disadvantages which prevent their use in the aqueous basecoat materials. These disadvantages include, in particular, a too weakly pronounced rheological effect and an absent thixotropic effect, and also insufficient stability, inadequate atomizability, and excessive sensitivity to a reduction in the pH of the aqueous basecoat materials in question.

A further disadvantage of the inorganic phyllosilicates is that they sometimes have adverse effects on the stability of aluminum effect pigments used in the aqueous basecoat material, with the consequence that they begin to gas if passivation is inadequate. In general, this can be remedied to a certain extent by chromating the surface of the aluminum effect pigments; however, chromating is not entirely unobjectionable from an environmental standpoint and is increasingly being shunned by users.

Another key disadvantage of the inorganic phyllosilicates is that they can be used exclusively in aqueous systems. The addition of sizable fractions of water-miscible organic solvents to aqueous basecoat materials prepared using said phyllosilicates causes streaking, phase separation, and flocculation. These adverse qualities make it impossible, for example, to use the customary and known, cost-effective dilute rinses to clean equipment and containers which have come into contact with the aqueous basecoat materials in question; instead, it is necessary to use special rinsing fluids such as mixtures of water, propanol, and butylene glycol.

A further disadvantage of the known aqueous basecoat material is that they have to be prepared in a plurality of stages, the sequence in which the constituents are incorporated being extremely critical for the success of the process. Moreover, it is frequently impossible to prepare concentrates having high solids contents, which is a disadvantage for storage and transportation.

Problems of rheology and thixotropy also occur, however, in pigment-free aqueous clearcoat materials.

Clearcoat materials are used to produce clearcoats and are frequently employed together with aqueous basecoat materials as part of the wet-on-wet process for producing multicoat color and/or effect coating systems on primed and unprimed substrates. In this process, as is known, basecoat films are applied to the substrates and are subsequently dried but not fully cured. The basecoat films are then overcoated with clearcoat films, after which both films are fully cured together.

Customary and known aqueous clearcoat materials are one-component (1K), two-component (2K) or multicomponent (3K, 4K) clearcoat materials curable thermally and/or with actinic radiation.

Aqueous one-component (1K) clearcoat materials comprise, in particular, hydroxyl-containing, water-soluble and/or water-dispersible binders, and also crosslinking agents such as blocked polyisocyanates, tris(alkoxycarbonylamino)triazine and/or amino resins.

Aqueous two-component (2K) and multicomponent (3K, 4K) clearcoat materials, as described, for example, in the European patent EP-A-0 654 052 (international patent application WO 94/03512), comprise—as is known—water-soluble and/or water-dispersible binders, containing isocyanate-reactive functional groups, especially hydroxyl groups, and also polyisocyanate crosslinking agents, the two components being stored separately from one another prior to their use.

Also known are siloxane clearcoat materials, which may be prepared by reacting hydrolyzable silicon compounds with water or water donors and which comprise organic constituents for the purpose of improving certain properties. Those materials are sold, for example, under the brand name ORMOCER® (organically modified ceramic). A general description of such systems can be found, for example, in the article by Bruce M. Novak, "Hybrid Nanocomposite Materials—Between Inorganic Glasses and Organic Polymers", in Advanced Materials, 1993, 5, No. 6, pp. 422–433, or in the paper by R. Kasemann, H. Schmidt, 15$^{th}$ International Conference, International Centre for Coatings Technology, Paper 7, "Coatings for mechanical and chemical protection based on organic-inorganic sol-gel nanocomposites", 1993.

In order to formulate the specifically desired rheological and thixotropic properties of the aqueous clearcoat materials, a large number of Theological aids are employed, examples being the polyurethane-based associative thickeners known from Römpp, op. cit., Georg Thieme Verlag, Stuttgart, New York, 1998, "thickeners", pages 599 to 600, and the textbook "Lackadditive" [Additives for coatings] by Johan Bieleman, Wiley-VCH, Weinheim, N.Y., 1998, pages 51 to 59 and 65. The thickeners known to date cannot, however, be used immediately, i.e., universally, in any aqueous clearcoat material, but instead have to be very carefully selected and matched to the specific case in hand.

Rheological aids based on urea urethanes are known and are available commercially. They are made up of diamines, diisocyanates, and polyalkylene glycol monoalkyl ethers as blocking agents for the isocyanate groups, and are commonly employed in solution in water-miscible solvents. Their use in aqueous compositions, especially in aqueous coating materials, adhesives, and sealing compounds curable physically, thermally, or thermally and with actinic radiation, was hitherto impossible.

It is an object of the present invention to open up new fields of application, especially in aqueous coating materials, adhesives, and sealing compounds, for the known Theological aids based on urea urethanes, without such use being accompanied by the above-described disadvantages of the prior art.

It is a further object of the present invention to find a novel aqueous composition, curable physically, thermally, or thermally and with actinic radiation, which no longer has the disadvantages of the prior art but which instead can be prepared in a simple process in a single step, the sequence of addition of the constituents being of little or no significance, which is stable as a concentrate, even with a solids content of more than 40% by weight, on storage and in transit, which has extremely stable pseudoplastic and thixotropic properties which are unaffected even by trivalent ferric ions, strong dipoles and/or strong electrical fields, and which may readily be processed to aqueous and conventional coating materials, adhesives, and sealing compounds which are curable physically, thermally, or thermally and with actinic radiation.

Accordingly we have found the novel aqueous composition curable physically, thermally, or thermally and with actinic radiation, comprising at least one compound containing urea and urethane groups and of the general formula I:

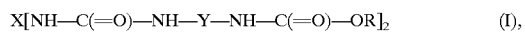

in which the variables have the following definition:
R denotes identical or different polyalkylene glycol ether radicals;
X denotes divalent substituted or unsubstituted arylene radical;
Y denotes identical divalent, substituted or unsubstituted arylene radicals identical to or different from the radical X, or
denotes different divalent, substituted or unsubstituted arylene radicals, of which none or one is identical to the radical X.

In the text below, the new novel aqueous composition curable physically, thermally, and thermally and with actinic radiation is referred to as the "composition of the invention".

Also found has been the novel process for preparing aqueous coating materials, adhesives, and sealing compounds, which involves
(1) preparing an aqueous or anhydrous composition curable physically, thermally, or thermally and with actinic radiation and comprising at least one compound, containing urea and urethane groups, of the general formula I:

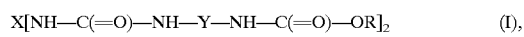

in which the variables have the following definition:
R denotes identical or different poly(alkylene-ether) radicals;
X denotes divalent substituted or unsubstituted arylene radical;
Y denotes identical divalent, substituted or unsubstituted arylene radicals identical to or different from the radical X, or
denotes different divalent, substituted or unsubstituted arylene radicals, of which none or one is identical to the radical X;
from its constituents by mixing, and
(2) diluting the resulting composition with water.

Also found has been the novel process for preparing aqueous coating materials, adhesives, and sealing compounds, which involves
(1) preparing an aqueous composition curable physically, thermally, or thermally and with actinic radiation and comprising at least one compound, containing urea and urethane groups, of the general formula I:

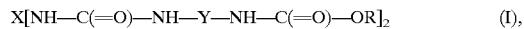

in which the variables have the following definition:
R denotes identical or different poly(alkylene-ether) radicals;
X denotes divalent substituted or unsubstituted arylene radical;
Y denotes identical divalent, substituted or unsubstituted arylene radicals identical to or different from the radical X, or
denotes different divalent, substituted or unsubstituted arylene radicals, of which none or one is identical to the radical X;
from its constituents by mixing, and
(2) diluting the resulting composition with at least one organic solvent or with a mixture of at least one solvent and water.

In the text below, the novel processes for preparing aqueous coating materials, adhesives and sealing compounds are referred to collectively as the "processes of the invention".

Additionally found, furthermore, have been the novel coatings, adhesive films, and seals on and in primed and unprimed substrates, which are producable from the compositions of the invention and/or by the processes of the invention and which are referred to below as the "coatings, adhesive films or seals of the invention".

Found not least have been the novel primed and unprimed substrates which have at least one coating, adhesive film and/or seal of the invention and which are referred to below as "substrates of the invention".

Further subject matter of the invention will emerge from the following description.

In the light of the prior art it was surprising and unforeseeable for a skilled worker that the object on which the present invention is based might be achieved with the aid of the specifically selected compounds I for use in accordance with the invention. Indeed, it was more likely that only a complicated variation in the binder basis would bring forth the effects of the invention. However, it was possible to achieve this objective by the comparatively very much simpler variation of the Theological aid, the resulting compositions of the invention surprisingly being of broad applicability and being outstandingly suitable for the production of aqueous systems. This was especially surprising in view of the fact that the compounds I for use in accordance with the invention had hitherto not been considered for use in aqueous systems.

The composition of the invention is physically curing. In the context of the present invention, the term "physical curing" denotes the curing of a layer of a coating material by filming as a result of loss of solvent from the coating material, with linking within the coating taking place by looping of the polymer molecules of the binders (regarding the term, cf. Römpp, op. cit., "Binders", pages 73 and 74). Or else filming takes place by way of the coalescence of binder particles (cf. Römpp, op. cit., "Curing", pages 274 and 275). Normally, no crosslinking agents are required for this purpose. If desired, the physical curing may be assisted by atmospheric oxygen or by exposure to actinic radiation.

The composition of the invention may also be thermally curing (thermosetting). In this case it may be self-crosslinking or externally crosslinking. In the context of the present invention, the term "self-crosslinking" refers to the property of a binder of undergoing crosslinking reactions with itself. A prerequisite for this is that the binders already contain both kinds of complementary reactive functional groups which are necessary for crosslinking. Externally crosslinking, on the other hand, is the term used to refer to those compositions of the invention wherein one kind of the complementary reactive functional groups is present in the binder and the other kind is present in a curing agent or crosslinking agent. For further details of this, reference is made to Römpp, op. cit., "curing", pages 274 to 276, especially the bottom of page 275.

Furthermore, the composition of the invention is curable thermally and with actinic radiation, this being referred to by those in the art as dual cure. In the context of the present invention, actinic radiation means electromagnetic radiation, such as visible light, UV radiation or X-rays, especially UV radiation, and corpuscular radiation such as electron beams.

The composition of the invention is aqueous. This means that its constituents are present in solution and/or dispersion in water or in a mixture comprising water and minor amounts of at least one water-miscible organic solvent. Minor amounts here mean amounts which do not destroy the aqueous nature of the mixture.

The inventively key constituent of the composition of the invention is the compound I, containing urea groups and urethane groups, of the above-described general formula I.

In the general formula I, the variable R represents identical or different poly(alkylene ether) radicals. It is of advantage in accordance with the invention to use identical poly(alkylene ether) radicals R. It is further advantageous to use hydrophilic poly(alkylene ether) radicals R.

In the context of the present invention, the property of being hydrophilic means the constitutional property of a molecule or of a functional group to penetrate the aqueous phase or to remain therein. Accordingly, the property of being hydrophobic in the context of the present invention denotes the constitutional property of a molecule or of a functional group to behave exophilically with respect to water, i.e., to tend not to penetrate water, or to depart from the aqueous phase. For further details, reference is made to Römpp op. cit., "hydrophilicity", "hydrophobicity", pages 294 and 295.

Advantageous hydrophilic poly(alkylene ether) radicals R are those of the general formula II:

$$—(—R^1—O—)_n—R^2 \qquad (II),$$

in which the index and the variables have the following definition:

n=2 to 10, preferably 2 to 8, more preferably 2 to 6, and in particular 3 to 5;

$R^1$=alkanediyl radical having 2 to 4 carbon atoms; and $R^2$=alkyl radical having 1 to 6 carbon atoms or cycloalkyl radical having 4 to 7 carbon atoms.

Examples of suitable alkanediyl radicals $R^1$ are ethane-1,2-diyl, propane-1,2-diyl, propane-1,3-diyl, butane-1,2-diyl, butane-1,3-diyl or butane-1,4-diyl radicals, of which the ethane-1,2-diyl radicals are of particular advantage and are therefore used with particular preference in accordance with the invention.

Examples of suitable alkyl radicals $R^2$ are methyl, ethyl, propyl, butyl, pentyl, hexyl or heptyl radicals, especially butyl radicals.

Examples of suitable cycloalkyl radicals $R^2$ are cyclobutyl, cyclopentyl, cyclohexyl or cyclohexyl radicals.

In accordance with the invention, the alkyl radicals $R^2$ are of advantage and are therefore used with preference.

Examples of especially suitable poly(alkylene ether) radicals R are triethylene glycol, tetraethylene glycol or pentaethylene glycol monobutyl ether radicals, of which the triethylene glycol monobutyl ether radical is especially advantageous and is therefore used with very particular preference in accordance with the invention.

In the general formula I, the variables X and Y represent divalent substituted or unsubstituted arylene radicals.

In any given compound I for use in accordance with the invention, identical arylene radicals Y may be used. In this case, the arylene radicals Y may be identical to or different from the arylene radical X. In accordance with the invention it is of advantage if the arylene radicals Y are different from the arylene radical X.

Furthermore, in any given compound I for use in accordance with the invention, use may be made of arylene radicals Y which are different from one another. In this case, one or no arylene radical Y may be identical to the arylene radical X. In accordance with the invention, it is of advantage here too if no arylene radical Y is identical to the arylene radical X.

In accordance with the invention it is of advantage if in any given compound I for use in accordance with the invention the arylene radicals Y are identical.

Examples of suitable arylene radicals X and Y are phen-1,2-, -1,3- or -1,4-ylene radicals, naphth-1,2-, -1,3-, -1,4-, -1,5-, -1,6-, -1,7-, -1,8- or -2,3-ylene radicals, biphenyl-4,4'-, -4,3'-, -4,2'-, -3,3'- or -2,2'-ylene radicals, methanediphenyl-4,4'-, -4,3'-, -4,2'-, -3,3'- or 2,2'-yelene radicals, ethane-1,1-diphenyl-4,4'-, -4,3'-, -4,2'-, -3,3'- or -2,2'-ylene radicals, or propane-2,2-diphenyl-4,4'-, -4,3'-, -4,2'-, -3,3'- or -2,2'-ylene radicals. Of these, the phenylene radicals are of advantage and are therefore used with preference.

In accordance with the invention, the substituted arylene radicals X and Y are of particular advantage and are therefore used with particular preference.

Substituents which may be used are all electron withdrawing or electron donating atoms or organic radicals which do not give rise to any unwanted secondary reactions during the preparation of the compounds I for use in accordance with the invention and/or during the storage and subsequent processing of the compositions of the invention and/or during the storage and use of the coating materials, adhesives, and sealing compounds of the invention. The skilled worker will therefore easily be able to identify suitable substituents on the basis of his or her general knowledge in the art.

Examples of suitable substituents are halogen atoms, especially chlorine and fluorine, nitrile groups, nitro groups, alkyl, cycloalkyl, alkylcycloalkyl, cycloalkylalkyl, aryl, alkylaryl, cycloalkylaryl, arylalkyl and arylcycloalkyl radicals, and also partly or fully halogenated, especially chlorinated and/or fluorinated, alkyl, cycloalkyl, alkycycloalkyl, cycloalkylalkyl, aryl, alkylaryl, cycloalkylaryl, arylalkyl and arylcycloalkyl radicals, especially alkyl radicals; aryloxy, alkyloxy and cycloalkyloxy radicals, especially phenoxy, naphthoxy, methoxy, ethoxy, propoxy, butyloxy or cyclohexyloxy; arylthio, alkylthio and cycloalkylthio radicals, especially phenylthio, naphthylthio, methylthio, ethylthio, propylthio, butylthio or cyclohexylthio; and tertiary amino groups, especially N,N-dimethylamino, N,N-diethylamino, N,N-dipropylamino, N,N-diphenylamino, N,N-dicyclohexylamino, N-cyclohexyl-N-methylamino, or N-ethyl-N-methylamino. Of these, the alkyl radicals are of particular advantage and are therefore used with preference. Very particular advantages result from the use of methyl radicals.

Examples of particularly preferred arylene radicals X and Y, therefore, are methyl-substituted phenylene radicals which are derived from toluene, o-, m- or p-xylene or their technical-grade mixtures, or from sym-trimethylbenzene, pseudocumene or hemellitene or their technical-grade mixtures, such as tol-2,3-, -2,4-, -2,5-, -2,6-, -3,4- or -3,5-ylene radicals, o-xyl-3,4-, -3,5- or -3,6-ylene radicals, m-xyl-2,4- or -2,5-ylene radicals, p-xyl-2,3-, -2,5- or -2,6-ylene radicals, 1,3,4-trimethylphen-1,4-ylene radicals, 1,2,4-trimethylphen-3,5-, -3,6- or -5,6-ylene radicals, or 1,2,3-trimethylphen-4,5- or -4,6-ylene radicals. Of these, the methyl-substituted phenyl radicals which derive from toluene, especially the tol-2,4- and -2,6-ylene radicals, and also the methyl-substituted phenylene radicals which derive from the technical-grade xylene mixtures, afford very particular advantages and are therefore used with very particular preference in accordance with the invention. Further advantages result if the arylene radicals X derive from the technical-grade xylene mixtures, and the arylene radicals Y from toluene.

Examples of very particularly preferred compounds I for use in accordance with the invention are the compounds I-1 to I-4, and mixtures thereof.

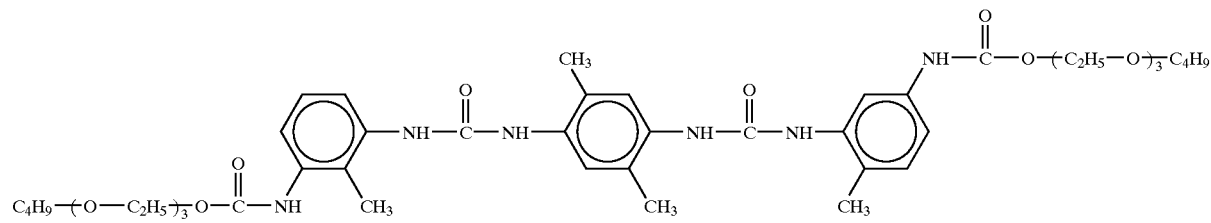

(I-1)

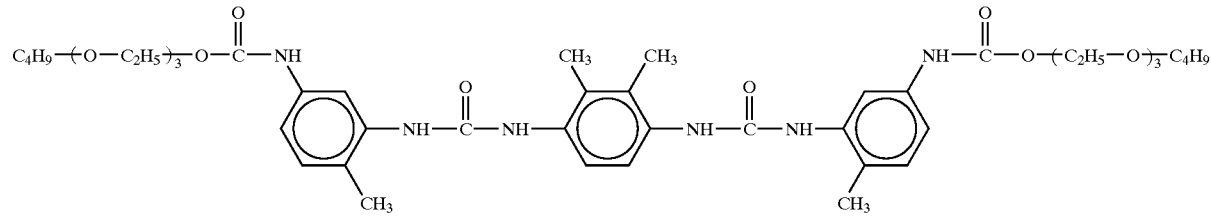

(I-2)

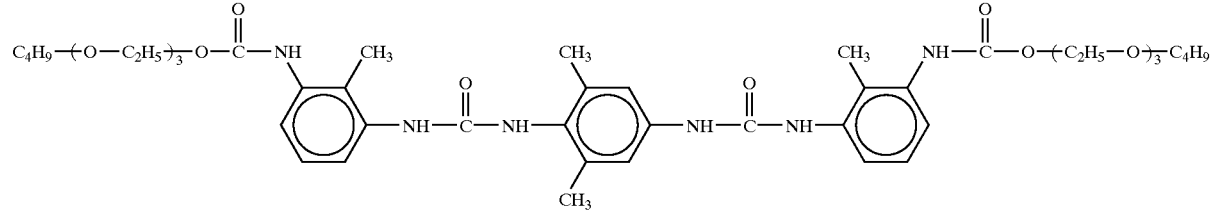

(I-3)

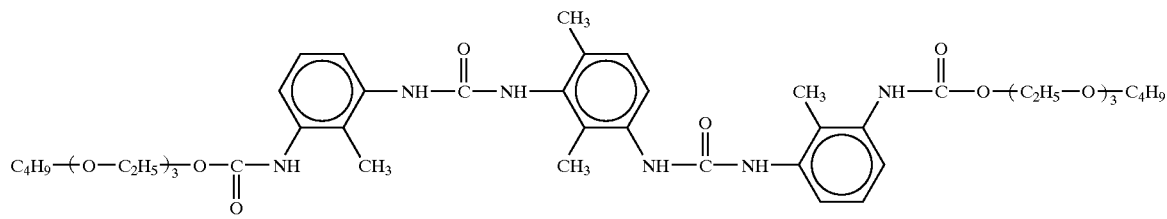

(I-4)

In terms of method, the preparation of the compounds I for use in accordance with the invention has no special features but instead takes place in accordance with the customary and known methods of organic isocyanate chemistry from suitable starting compounds, with or without the use of customary and known catalysts such as dibutyltin oxide or dibutyltin dilaurate, using the customary and known apparatus for reacting polyisocyanates and also the corresponding precautionary measures.

Suitable starting compounds X for introducing the above-described arylene radicals X are the corresponding arylenediamines, especially the xylylenediamines.

Suitable starting compounds Y for introducing the above-described arylene radicals X are the corresponding arylene diisocyanates, especially the tolylene diisocyanates.

Suitable starting compounds R for introducing the above-described poly(alkylene ether) radicals are the corresponding poly(alkylene glycol) monoalkyl ethers or monocycloalkyl ethers, especially triethylene glycol monobutyl ether.

Preferably, the starting compounds X, Y and R are reacted with one another in a molar ratio of (0.8 to 1.2):(1.8 to 2.2):(1.9 to 2.3) and, in particular, 1.0:2.0:2.0.

The amount of the compounds I for use in accordance with the invention in the compositions of the invention may vary very widely. At the bottom end, the amount is limited by the minimum amount of compound I for use in accordance with the invention which still just brings about the desired technical effects. At the top end it is limited by the viscosity developed in the composition of the invention. Accordingly, the amount will generally be chosen such that the composition of the invention does not become too viscous to be handled. The amount preferably, based in each case on the composition, is from 0.1 to 10, more preferably from 0.2 to 8, with particular preference from 0.3 to 6, with very particular preference from 0.4 to 4, and in particular from 0.5 to 3% by weight.

The compound I for use in accordance with the invention may be employed in one hundred percent form. In accordance with the invention it is of advantage to use it in solutions in at least one organic solvent, especially a water-miscible organic solvent such as N-methylpyrrolidone. It is preferred in this case to employ solids contents of from 10 to 80 and, in particular, from 30 to 70% by weight.

The composition of the invention further comprises constituents as customary and known for coating materials, adhesives, and sealing compounds which are curable physically, thermally, or thermally and with actinic radiation.

A further constituent which is particularly important for performance is at least one binder which essentially renders the compositions of the invention curable physically, thermally, or thermally and with actinic radiation.

Examples of suitable binders are random, alternating and/or block, linear and/or branched and/or comb, addition (co)polymers of ethylenically unsaturated monomers, or polyaddition resins and/or polycondensation resins. For further details of these terms, reference is made to Römpp, op. cit., page 457, "polyaddition" and "polyaddition resins (polyadducts)", and also pages 463 and 464, "polycondensates", "polycondensation", and "polycondensation resins".

Examples of suitable binders of the kind mentioned above for compositions of the invention that are curable physically or thermally, especially thermally, are poly(meth)acrylates or acrylate copolymers, especially those described in the patent DE-A-197 36 535 or DE-A-197 41 554; polyesters, especially those described in the patent DE-A-40 09 858 or DE-A-44 37 535; alkyds, acrylated polyesters, polylactones, polycarbonates, polyethers, epoxy resin-amine adducts, (meth)acrylatediols, partially saponified polyvinyl esters, polyureas or poly-urethanes, of which the polyurethanes, the acrylate copolymers and/or the polyesters are particularly advantageous and the polyurethanes are very particularly advantageous.

These binders contain reactive functional groups which are contained with complementary reactive functional groups in the binders themselves (self-crosslinking) or in crosslinking agents (external crosslinking).

Examples of suitable complementary reactive functional groups for use in accordance with the invention which enter into crosslinking reactions are summarized in the overview below. In the overview, the variable $R^3$ represents an acyclic or cyclic aliphatic, an aromatic, and/or an aromatic-aliphatic (araliphatic) radical; the variables $R^4$ and $R^5$ represent identical or different aliphatic radicals or are linked with one another to form an aliphatic or heteroaliphatic ring.

Overview: Examples of complementary functional groups
in the binder and crosslinking agent or
crosslinking agent and binder

| | |
|---|---|
| —SH | —C(O)—OH |
| —NH₂ | —C(O)—O—C(O)— |
| —OH | —NCO |

-continued

Overview: Examples of complementary functional groups
in the binder and crosslinking agent or
crosslinking agent and binder

| | |
|---|---|
| —O—(CO)—NH—(CO)—NH₂ | —NH—C(O)—OR³ |
| —O—(CO)—NH₂ | —CH₂OH |
| | —CH₂—O—CH₃ |
| | —NH—C(O)—CH(—C(O)OR³)₂ |
| | —NH—C(O)—CH(—C(O)OR³)(—C(O)—R³) |
| | —NH—C(O)—NR⁴R⁵ |
| | =Si(OR³)₂ |
| | 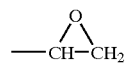 |
| | 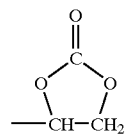 |
| —C(O)—OH | 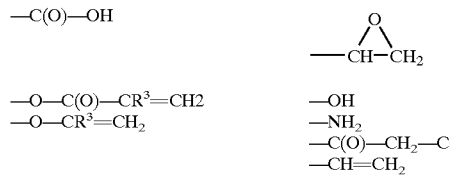 |
| —O—C(O)—CR³=CH2 | —OH |
| —O—CR³=CH₂ | —NH₂ |
| | —C(O)—CH₂—C(O)—R³ |
| | —CH=CH₂ |

The selection of the respective complementary groups is guided on the one hand by the consideration that they should not enter into any unwanted reactions in the course of storage and/or, in the case of dual cure, should not disrupt or inhibit the curing with actinic radiation, and secondly by the temperature range within which the thermal curing is to take place.

It is of advantage in this case, in accordance with the invention and especially in respect of thermally sensitive substrates such as plastics, to choose a temperature range which does not exceed 100° C., especially 80° C. In the light of these boundary conditions, hydroxyl groups and isocyanate groups, or carboxyl groups and epoxy groups, have proven advantageous as complementary functional groups, and so are employed with preference in accordance with the invention in the coating materials, adhesives, and sealing compounds of the invention which are present in the form of two-component or multicomponent systems. Particular advantages result here if the hydroxyl groups are used as reactive functional groups and the isocyanate groups as complementary reactive functional groups.

Where higher crosslinking temperatures may be employed, for example, from 100° C. to 180° C., suitable coating materials, adhesives, and sealing compounds of the invention include one-component systems as well, in which the reactive functional groups are preferably thio, amino, hydroxyl, carbamate, allophanate, carboxyl, and/or (meth)acrylate groups, but especially hydroxyl groups, and the complementary reactive functional groups are preferably anhydride, carboxyl, epoxy, blocked isocyanate, urethane, methylol, methylol ether, siloxane, amino, hydroxyl and/or beta-hydroxyalkylamide groups, but especially blocked isocyanate, urethane, methylol or methylol ether groups.

Where the compositions of the invention are to be curable not only thermally but also with actinic radiation (dual cure), they further comprise customary and known binders which can be activated with actinic radiation. Examples of suitable binders which can be activated with actinic radiation are (meth)acryloyl-, allyl-, vinyl- or dicyclopentadienyl-functional (meth)acrylate copolymers or polyether acrylates, polyester acrylates, unsaturated polyester acrylates, epoxy acrylates, urethane acrylates, amino acrylates, melamine acrylates, silicone acrylates, or the corresponding methacrylates. It is, however, also possible to employ binders which contain functional groups which can be activated with actinic radiation and reactive functional groups which are able to undergo thermal crosslinking reactions.

Examples of the polyurethanes used with very particular preference are ionically and/or nonionically stabilized polyurethanes which are saturated, unsaturated, and/or grafted with olefinically unsaturated compounds.

Advantageously, depending on the nature of the stabilization, the polyurethanes have an acid number or amine number of from 10 to 250 mg KOH/g (ionic stabilization or nonionic plus ionic stabilization) or of from 0 to 10 mg KOH/g (nonionic stabilization), an OH number of from 30 to 350 mg KOH/g, and a number average molecular weight of from 1500 to 55,000 daltons.

The method of preparing the polyurethanes is arbitrary. They are preferably obtainable by preparing, in a first process step, a polyurethane prepolymer which contains at least one free isocyanate group.

The polyurethane prepolymer is of linear, branched or comb, but especially linear, construction. In this context the linear polyurethane prepolymer includes preferably two free isocyanate groups, especially two terminal free isocyanate groups. The branched or comb-constructed polyurethane prepolymers include preferably at least two, in particular more than two, free isocyanate groups, terminal free isocyanate groups being preferred.

In terms of method, the preparation of the polyurethane prepolymers for use in accordance with the invention has no special features but instead takes place, for example, as described in patent EP-A-0 089 497, DE-C-197 22 862, DE-A-196 45 761, EP-A-0 522 419 or EP-A-0 522 420, by reaction of a polyol, especially a diol, with at least one polyisocyanate, especially a diisocyanate, the isocyanate component being employed in a molar excess so as to give terminal free isocyanate groups.

For the preparation of the polyurethane prepolymers it is preferred to use diisocyanates and also, if desired, in minor amounts, polyisocyanates, for the purpose of introducing branches. In the context of the present invention, minor amounts are amounts which do not cause gelling of the polyurethane prepolymers during their preparation. This may also be prevented by using small amounts of monoisocyanates.

Examples of suitable diisocyanates are isophorone diisocyanate (i.e., 5-isocyanato-1-isocyan atomethyl-1,3,3-trimethylcyclohexane), 5-isocyanato-1-(2-isocynatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)-cyclohexane, 1-isocyanato-2-(4-isocyanatobut-1-yl) cyclohexane, 1,2-diisocyanatocyclobutane, 1,3-diisocyanatocyclobutane, 1,2-diisocyanatocyclobutane, 1,3-diisocyanatocyclobutane, 1,2-diisocyanatocyclobutane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate; ethylethylene diisocyanate, trimethylhexane diisocyanate, heptane methylene diisocyanate or diisocyanates derived from dimeric fatty acids, as marketed under the commercial designation DDI 1410 by the company Henkel and described in the patents WO 97/49745 and WO 97/49747, especially 2-heptyl-3,4-bis(9-isocyanatononyl)-1-phenylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-yl)cyclohexane, 1,2-, 1,4- or 1,3-bis(4-isocyanatobut-1-yl)cyclohexane, liquid bis(4-isocyanatocyclohexyl)methane with a trans/trans content of up to 30% by weight, preferably 25% by weight, and in particular 20% by weight, as is described by the patents DE-A-44 14 032, GB-A-1220717, DE-A-16 18 795 or DE-A-17 93 785; tetramethylxylylene diisocyanate (TMXDI® from CYTEC), tolylene diisocyanate, xylylene diisocyanate, biphenylene diisocyanate, naphthylene diisocyanate or diphenylmethane diisocyanate.

Examples of suitable polyisocyanates based on the diisocyanates described above are isocyanato-containing polyurethane prepolymers, which have been prepared by reacting polyols with an excess of at least one of the above-described diisocyanates, and/or polyisocyanates containing isocyanurate, biuret, allo-phanate, iminooxadiazinedione, urethane, urea and/or uretdione groups. It is preferred to use polyiso-cyanates containing on average from 2.5 to 5 isocyanate groups per molecule and having viscosities of from 100 to 10,000, preferably from 100 to 5000 mPas. Furthermore, the polyisocyanates may have been subjected to conventional hydrophilic or hydrophobic modification.

Very particular preference is given to mixtures of polyisocyanates which contain uretdione and/or isocyanurate and/or allophanate groups and which are based on the above-described diisocyanates as formed by catalytic oligomerization of diisocyanates using appropriate catalysts.

Examples of suitable monoisocyanates are phenyl isocyanate, cyclohexyl isocyanate or stearyl iso-cyanate, or vinyl isocyanate, methacryloylisocyanate, and/or 1-(1-isocyanato-1-methylethyl)-3-(1-methyl-ethenyl)benzene (TMI® from CYTEC).

Examples of suitable polyols are saturated or olefinically unsaturated polyesterpolyols which are prepared by reacting
unsulfonated or sulfonated saturated and/or unsaturated polycarboxylic acids or their esterifiable derivatives, alone or together with monocarboxylic acids, and
saturated and/or unsaturated polyols, alone or together with monools.

Examples of suitable polycarboxylic acids are aromatic, aliphatic and cycloaliphatic polycarboxylic acids. Preference is given to the use of aromatic and/or aliphatic polycarboxylic acids.

Examples of suitable aromatic polycarboxylic acids are phthalic acid, isophthalic acid, terephthalic acid, phthalic, isophthalic or terephthalic acid monosulfonate, or halophthalic acids, such as tetrachlorophthalic or tetrabromophthalic acid, among which isophthalic acid is advantageous and is therefore used with preference.

Examples of suitable acyclic aliphatic or unsaturated polycarboxylic acids are oxalic acid, malonic acid, succinic acid, glutaric acid, adipic acid, pimelic acid, suberic acid, azelaic acid, sebacic acid, undecanedicarboxylic acid or dodecanedicarboxylic acid, or dimeric fatty acids or maleic acid, fumaric acid or itaconic acid, of which adipic acid, glutaric acid, azelaic acid, sebacic acid, dimeric fatty acids and maleic acid are advantageous and are therefore used with preference.

Examples of suitable cycloaliphatic and cyclic unsaturated polycarboxylic acids are 1,2-cyclo butanedicarboxylic acid, 1,3-cyclobutanedicarboxylic acid, 1,2-cyclopentanedicarboxylic acid, 1,3-cyclopentanedicarboxylic acid, hexahydrophthalic acid, 1,3-cyclohexanedicarboxylic acid, 1,4-cyclohexanedicarboxylic acid, 4-methylhexahydrophthalic acid, tricyclodecanedicarboxylic acid, tetrahydrophthalic acid or 4-methyltetrahydrophthalic acid. These dicarboxylic acids may be used both in their cis and in their trans form and also as a mixture of both forms.

Also suitable are the esterifiable derivatives of the abovementioned polycarboxylic acids, such as their monoesters or polyesters with aliphatic alcohols having 1 to 4 carbon atoms or hydroxy alcohols having 1 to 4 carbon atoms, for example. It is also possible to use the anhydrides of the abovementioned polycarboxylic acids, where they exist.

Together with the polycarboxylic acids it is also possible if desired to use monocarboxylic acids, such as, for example, benzoic acid, tert-butylbenzoic acid, lauric acid, isononanoic acid, fatty acids of naturally occurring oils, acrylic acid, methacrylic acid, ethacrylic acid or crotonic acid. The preferred monocarboxylic acid used is isononanoic acid.

Examples of suitable polyols are diols and triols, especially diols. Normally, triols are used alongside the diols in minor amounts in order to introduce branches into the polyester polyols.

Suitable diols are ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, diethylene glycol, 1,2-, 1,3- or 1,4-cyclohexanediol, 1,2-, 1,3- or 1,4-cyclohexane-dimethanol, trimethylpentanediol, ethylbutylpropane-diol, the positionally isomeric diethyloctanediols 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-di-hydroxymethylbicyclo[2.2.1]heptane, 2,2-diethyl-1,3- propanediol, 2,2-dipropyl-1,3-propanediol 2-cyclohexyl-2-methyl-1,3-propanediol, 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, 1,4-bis(2'-hydroxypropyl)benzene and 1,3-bis(2'-hydroxypropyl)benzene. These diols may also be used per se for the preparation of the polyurethanes.

Of these diols, hexanediol and neopentyl glycol are particularly advantageous and are therefore used with particular preference.

Examples of suitable triols are trimethylol-ethane, trimethylolpropane or glycerol, especially trimethylolpropane.

The abovementioned triols may also be used per se to prepare the polyurethanes (A) for inventive use (cf. the patent EP-A-0 339 433).

If desired, minor amounts of monools may also be used. Examples of suitable monools are alcohols or phenols such as ethanol, propanol, n-butanol, sec-butanol, tert-butanol, amyl alcohols, hexanols, fatty alcohols, allyl alcohol, or phenol.

The polyesterpolyols may be prepared in the presence of small amounts of a suitable solvent as entrainer. Examples of entrainers used are aromatic hydrocarbons, such as especially xylene and (cyclo)aliphatic hydrocarbons, e.g., cyclohexane or methylcyclohexane.

Further examples of suitable polyols are polyesterdiols which are obtained by reacting a lactone with a diol. They are notable for the presence of terminal hydroxyl groups and repeating polyester fractions of the formula —(—CO—(CHR$^6$)$_m$—CH$_2$—O—)—. Here, the index m is preferably from 4 to 6 and the substituent R$^6$ is hydrogen or an alkyl, cycloalkyl, or alkoxy radical. No substituent contains more than 12 carbon atoms. The total number of carbon atoms in the substituent does not exceed 12 per lactone ring. Examples are hydroxycaproic acid, hydroxybutyric acid, hydroxydecanoic acid, and/or hydroxystearic acid.

Preferred for to preparation of the polyesterdiols is the unsubstituted ε-caprolactone, where m is 4 and all substitutes R$^6$ are hydrogen. The reaction with lactone is started by low molecular mass polyols such as ethylene glycol, 1,3-propanediol, 1,4-butanediol, or dimethylolcyclohexane. It is also possible, however, to react other reaction components, such as ethylenediamine, alkyldialkanolamines, or else urea, with caprolactone. Other suitable diols of relatively high molecular mass we polylactamdiols, which are prepared by reacting, for example, ε-caprolactam with low molecular mass diols.

Further examples of suitable polyols include polyetherpolyols, especially those having a number-average molecular weight of from 400 to 5000, in particular from 400 to 3000. Examples of highly suitable polyetherdiols are polyetherdiols of the general formula H—(—O—(CHR$^7$)$_o$—)$_p$OH, where the substituent R$^7$ is hydrogen or a lower, unsubstituted or substituted alkyl radical, the index o is from 2 to 6, preferably from 3 to 4, and the index p is from 2 to 100, preferably from 5 to 50. Especially suitable examples are linear or branched polyetherdiols such as poly(oxyethylene) glycols, poly(oxypropylene) glycols, and poly(oxybutylene) glycols.

The polyetherdiols should, firstly, not introduce excessive amounts of ether groups, since otherwise the polyurethanes formed start to swell in water. Secondly, they may be used in amounts which ensure the nonionic stabilization of the polyurethanes. In that case they act as the functional nonionic groups described below.

The polyurethane comprises alternatively functional groups convertible into cations by neutralizing agents and/or quaternizing agents, and/or cationic groups, especially ammonium groups, or functional groups convertible into anions by neutralizing agents, and/or anionic groups, especially carboxylic acid and/or carboxylate groups, and/or nonionic hydrophilic groups, especially poly(alkylene ether) groups.

Examples of suitable functional groups which are convertible into cations by neutralizing agents and/or quaternizing agents are primary, secondary or tertiary amino groups, secondary sulfide groups or tertiary phosphine groups, especially tertiary amino groups or secondary sulfide groups.

Examples of suitable cationic groups are primary, secondary, tertiary or quaternary ammonium groups, tertiary sulfonium groups or quaternary phosphonium groups, preferably quaternary ammonium groups or tertiary sulfonium groups, but especially tertiary sulfonium groups.

Examples of suitable functional groups which are convertible into anions by neutralizing agents are carboxylic acid, sulfonic acid or phosphonic acid groups, especially carboxylic acid groups.

Examples of suitable anionic groups are carboxylate, sulfonate or phosphonate groups, especially carboxylate groups.

Examples of suitable neutralizing agents for functional groups convertible into cations are organic and inorganic acids such as formic acid, acetic acid, lactic acid, dimethylolpropionic acid, citric acid, sulfuric acid, hydrochloric acid, and phosphoric acid.

Examples of suitable neutralizing agents for functional groups convertible into anions are ammonia, ammonium salts, such as ammonium carbonate or ammonium bicarbonate for example, and also amines, such as trimethylamine, triethylamine, tributylamine, dimethyl-aniline, diethylaniline, triphenylamine, dimethyl-ethanolamine, diethylethanolamine, methyldiethanol-amine, triethanolamine and the like, for example. Neutralization may take place in organic phase or in aqueous phase. A preferred neutralizing agent used is dimethylethanolamine.

The amount of neutralizing agent used overall in the compositions of the invention is chosen so that from 1 to 100 equivalents, preferably from 50 to 90 equivalents, of the potentially cationic or anionic functional groups of the polyurethane are neutralized.

Of these functional (potentially) ionic groups and functional nonionic groups, the (potentially) anionic groups are advantageous and are therefore used with particular preference.

The introduction of (potentially) anionic groups into the polyurethane molecules takes place by way of the incorporation of compounds which contain in the molecule at least one isocyanate-reactive group and at least one group capable of forming anions; the amount to be used may be calculated from the target acid number.

Examples of suitable compounds of lids kind are those containing two isocyanato-reactive groups in the molecule. In particular, suitable isocyanate-reactive groups are hydroxyl groups, and primary and/or secondary amino groups. Accordingly it is possible for example, to use alkanoic acids having two substitutes on the αcarbon atom. The substituent may be a hydroxyl group, an alkyl group, or, preferably, an alkylol group. These alkanoic acids have at least one generally from 1 to 3, carboxyl groups in the molecule. They have 2 to about 25, preferably 3 to 10, carbon atoms. Examples of suitable alkanoic acids are dihydroxypropionic acid, dihydroxysuccinic add, and dihydroxybenzoic acid. A particularly preferred group of alkanoic acids are the α, α-dimethylolalkanoic acids; of the general formula $R^8$—$C(CH_2OH)_2COOH$, $R^8$ being a hydrogen atom or an alkyl group having up to about 20 carbon atoms. Examples of especially suitable alkanoic acids are 2,2-dimethylolacetic acid, 2,2-dimethylolpropionic acid, 2,2-dimethylolbutyric acid, and 2,2-dimethylolpentanoic acid. The preferred dihydroxyalkanoic acid is 2,2-dimethylolpropionic acid. Examples of compounds containing amino groups are α, δ-diaminovaleric acid, 3,4-diaminobeazoic acid, 2,4-diaminotoluenesulfonic acid, and 2,4-diaminodiphenyl ether sulfonic acid. If desired, monohydroxy- and/or monomercaptocarboxylic acids such as hydroxyacetic acid or thioglycolic acid may also be used.

Nonionic stabilizing poly(oxyalkylene) and/or poly(alkylene ether) groups may be introduced as lateral or terminal groups into the polyurethane molecules. For this purpose it is possible to use, for example, alkoxypoly(oxyalkylene) alcohols and/or poly(alkylene glycol) monoalkyl ethers having the general formula $R^9O$—(—$CH_2$—$CHR^{10}$—O—)$_r$H, where $R^9$ is an alkyl radical having 1 to 6 carbon atoms, $R^{10}$ is a hydrogen atom or an alkyl radical having 1 to 6 carbon atoms, and the index r is a number between 20 and 75 (cf. the patents EP-A-0 354 261 or EP-A-0 424 705).

The use of polyols, polyamines and amino alcohols brings about an increase in the molecular weight of the polyurethanes.

Suitable polyols for the chain extension are polyols having up to 20 carbon atoms per molecule, such as ethylene glycol, diethylene glycol, triethylene glycol, 1,2-propanediol, 1,3-propanediol, 1,4-butane-diol, 1,2-butylene glycol, 1,6-hexanediol, trimethylol-propane, castor oil or hydrogenated castor oil, ditrimethylolpropane ether, pentaerythritol, 1,2-cyclohexanediol, 1,4-cyclohexanedimethanol, bisphenol A, bisphenol F, neopentyl glycol, neopentyl glycol hydroxypivalate, hydroxyethylated or hydroxypropylated bisphenol A, hydrogenated bisphenol A, or mixtures thereof (cf. patents EP-A-0 339 433, EP-A-0 436 941, EP-A-0 517 707).

Examples of suitable polyamines have at least two primary and/or secondary amino groups. Polyamines are essentially alkylene polyamines having 1 to 40 carbon atoms, preferably about 2 to 15 carbon atoms. They may carry substituents which have no hydrogen atoms that are reactive with isocyanate groups. Examples are polyamines having a linear or branched aliphatic, cycloaliphatic or aromatic structure and at least two primary amino groups.

Diamines include hydrazine, ethylenediamine, propylenediamine, 1,4-butylenediamine, piperazine, 1,4-cyclohexyldimethylamine, 1,6-hexamethylenediamine, trimethylhexamethylenediamine, menthanediamine, isophoronediamine, 4,4'-diaminodicyclohexylmethane, and aminoethyleneothanolamine. Preferred diamines are hydrazine, alkyl- or cycloalkyldiamines such as propylenediamine and 1-amino-3-aminomethyl-3,5,5-trimethylcyclohexane.

It is also possible to use polyamines containing more than two amino groups in the molecule. In these cases, however, it should be ensured—for example, by using monoamines as well—that no crosslinked polyurethane resins are obtained. Polyamines of this kind which may be used are diethylenetriamine, triethylenetetramine, dipropylenediamine, and dibutylenetriamine. An example of a monoamine is ethylhexylamine (cf. the patent EP-A-0 089 497).

Examples of suitable amino alcohols are ethanolamine and diethanolamine.

The polyurethanes may contain lateral and/or terminal olefinically unsaturated groups. Groups of this kind may be introduced, for example, with the aid of compounds containing at least one isocyanate-reactive group, especially hydroxyl group, and at least one vinyl group. Examples of suitable compounds of this kind are trimethylolpropane monoallyl ether and trimethylolpropane mono(meth)acrylate.

The polyurethanes may be grafted with ethylenically unsaturated compounds. Examples of suitable polyurethanes in the form of graft copolymers are known from the patents EP-A-0 521 928, EP-A-0 522 420, EP-A-0 522 419 or EP-A-0 730 613.

The proportion of the binders, especially of the polyurethanes, in the compositions of the invention may vary extremely widely and is guided primarily by the intended use of the compositions and, if appropriate, by the functionality of the binders with respect to the crosslinking reaction with the crosslinking agents, where present. In accordance with the invention it is of advantage to use the binders in an amount, based in each case on the composition, of from 2.0 to 90, preferably from 3.0 to 85, with particular preference from 4.0 to 80, with very particular preference from 5.0 to 75, and in particular from 6.0 to 70% by weight. As regards the polyurethanes, it is of particular advantage in accordance with the invention to use the amounts as described in the patents EP-A-0 089 497, DE-C-197 22 862, DE-A-196 45 761, EP-A-0 522 419 and EP-A-0 522 420.

A further key performance constituent of the compositions of the invention is at least one color and/or effect pigment.

The pigments may comprise organic and inorganic compounds. On the basis of this large number of appropriate pigments, therefore, the coating material especially the aqueous basecoat and solid color topcoat material, particularly the aqueous basecoat material of the invention ensures a universal breadth of application and permits the realization of a large number of color shades and optical effects.

Effect pigments which may be used include metal flake pigments such as commercial aluminum bronzes, aluminum bronzes chromated in accordance with DE-A-36 36 183, and commercial stainless steel bronzes, and also nonmetallic effect pigments, such as pearlescent pigments and interference pigments, for example. For further details, reference is made to Römpp, op. cit., page 176, "effect pigments" and pages 380 and 381 "metal oxide-mica pigments" to "metal pigments".

Examples of suitable inorganic color pigments are titanium dioxide, iron oxides, sicotrans yellow, and carbon black. Examples of suitable organic color pigments are thioindigo pigments, indanthrene blue, Cromophthal red, Irgazine orange and Heliogen green. For further details, reference is made to Römpp, op. cit., pages 180 and 181, "iron blue pigments" to "black iron oxide", pages 451 to 453 "pigments" to "pigment volume concentration", page 563 "thioindigo pigments", and page 567 "titanium dioxide pigments".

The pigments are preferably incorporated in paste form into the compositions of the invention, in which case suitable grinding resins include the binders described above.

The pigment content of the coating material of the invention may vary extremely widely and is guided primarily by the hiding power of the pigments, the desired shade, and the desired optical effect. In the composition of the invention, the pigments are present in an amount of preferably from 0.5 to 50, more preferably from 0.5 to 45, with particular preference from 0.5 to 40, with very particular preference from 0.5 to 35, and in particular from 0.5 to 30% by weight, based in each case on the overall weight of the composition.

The pigment/binder ratio as well, i.e., the ratio of the pigments to the binders, may vary extremely widely. This ratio is preferably from 6.0:1.0 to 1.0:50, more preferably from 5:1.0 to 1.0:50, with particular preference from 4.5:1.0 to 1.0:40, with very particular preference from 4:1.0 to 1.0:30, and in particular from 3.5:1.0 to 1.0:25.

The use of these pigments is omitted when the compositions of the invention are used to prepare the clearcoat materials of the invention or the pigment-free adhesives and sealing compounds of the invention.

Yet another key performance constituent of the compositions of the invention is at least one crosslinking agent for the thermal crosslinking or curing. Its use is omitted when the compositions of the invention are physically curing or self-crosslinking, or when they are used to prepare the corresponding coating materials, adhesives, and sealing compounds of the invention.

Suitable crosslinking agents preferably contain the complementary groups described above. Examples of suitable crosslinking agents are amino resins such as melamine resins or urea resins, resins or compounds containing anhydride groups, resins or compounds containing epoxide groups, tris(alkoxycarbonylamino)-triazines, resins or compounds containing carbonate groups, blocked and/or unblocked polyisocyanates, beta-hydroxyalkylamides, and compounds containing on average at least two groups capable of transesterification, examples being reaction products of malonic diesters and polyisocyanates or of esters and partial esters of polyhydric alcohols of malonic acid with monoiso-cyanates, as described in the European patent EP-A-0 596 460. Crosslinking agents of this kind are well known to the skilled worker and are offered as commercial products by numerous companies.

Depending on the reactivity of the further crosslinking agent, it may be added directly to the compositions of the invention, producing what is known as a one-component system. If, however, it is a particularly reactive crosslinking agent, such as a polyisocyanate or an epoxide, it is generally not added to the coating materials of the invention until shortly before use. The result in this case is what is known as a two-component or multicomponent system.

The crosslinking agent content of the compositions of the invention may vary extremely widely and is guided primarily by the functionality of the above-described binders. The crosslinking agents are used in an amount, based in each case on the composition, of preferably from 0.5 to 50, more preferably from 1.0 to 45, with particular preference from 1.5 to 40, with very particular preference from 2.0 to 35, and, in particular, from 2.5 to 30% by weight.

Still another key performance constituent of the compositions of the invention is at least one reactive diluent for the thermal curing or for the curing with actinic radiation.

Examples of suitable reactive diluents for thermal curing are oligomeric polyols obtainable by hydroformylation and subsequent hydrogenation from oligomeric intermediates themselves obtained by metathesis reactions of acyclic monoolefins and cyclic monoolefins; examples of suitable cyclic monoolefins are cyclobutene, cyclopentene, cyclohexene, cyclo-octene, cycloheptene, norbornene and 7-oxanorbornene; examples of suitable acyclic monoolefins are contained in hydrocarbon mixtures which are obtained in petroleum processing by cracking ($C_5$ cut); examples of suitable oligomeric polyols for use in accordance with the invention have a hydroxyl number of from 200 to 450, a number average molecular weight Mn of from 400 to 1000, and a mass average molecular weight Mw of from 600 to 1100; further examples of suitable polyols are branched, cyclic and/or acyclic $C_9$–$C_{16}$ alkanes functionalized with at least two hydroxyl groups, especially diethyloctanediols.

Further examples of polyols for use are hyperbranched compounds having a tetrafunctional central group, derived from ditrimethylolpropane, diglycerol, ditrimethylolethane, pentaerythritol, tetrakis(2-hydroxyethyl)methane, tetrakis (3-hydroxy-propyl)methane or 2,2-bishydroxymethyl-1,4-butanediol (homopentaerythritol). These reactive diluents may be prepared by the customary and known methods of preparing hyperbranched and dendrimeric compounds. Suitable synthesis methods are described, for example, in the patent WO 93/17060 or WO 96/12754, or in the book by G. R. Newkome, C. N. Moorefield and F. Vögtle, "Dendritic Molecules, Concepts, Syntheses, Perspectives", VCH, Weinheim, N.Y., 1996.

Suitable radiation-curable reactive diluents include polyfunctional, ethylenically unsaturated compounds of low molecular mass. Examples of suitable such compounds are esters of acrylic acids with polyols, such as neopentyl glycol diacrylate, trimethylolpropane triacrylate, pentaerythritol triacrylate or pentaerythritol tetraarylate; or reaction products of hydroxyalkyl acrylates with polyisocyanates, especially aliphatic polyisocyanates. For further details, reference is made to Römpp, op. cit., "reactive diluents", page 491.

The composition of the invention may further comprise effective amounts of additives as commonly used in coating materials, adhesives and sealing compounds. Examples of suitable additives are:

organic and inorganic fillers such as chalk, calcium sulfate, barium sulfate, silicates such as talc or kaolin, silicas, oxides such as aluminum hydroxide or magnesium hydroxide, nanoparticles, or organic fillers such as textile fibers, cellulose fibers, polyethylene fibers or wood flour;

UV absorbers;

free-radical scavengers;

crosslinking catalysts;

slip additives;

polymerization inhibitors;

defoamers;

emulsifiers, especially nonionic emulsifiers such as alkoxylated alkanols, polyols, phenols and alkylphenols or anionic emulsifiers such as alkali metal salts or ammonium salts of alkanecarboxylic acids, alkanesulfonic acids and sulfo acids of alkoxylated alkanols, polyols, phenols and alkylphenols;

wetting agents such as siloxanes, fluorine compounds, carboxylic monoesters, phosphates, polyacrylic acids and their copolymers, or polyurethanes;

adhesion promoters;

leveling agents;

film-forming auxiliaries such as cellulose derivatives;

flame retardants;

waxes, examples being acrylic copolymer waxes dissolved in organic solvents;

rheology control additives, such as those known from the patents WO 94/22968, EP-A-0 276 501 EP-A-0 249 201, WO 97/12945; crosslinked polymeric microparticles, as disclosed for example in EP-A-0 008 127; inorganic phyllosilicates, such as aluminum-magnesium silicates, sodium-magnesium and sodium-magnesium-fluorine-lithium phyllosilicates of the montmorillonite type; silicas such as Aerosils; or synthetic polymers containing ionic and/or associative groups, such as polyvinyl alcohol, poly(meth) acrylamide, poly(meth)acrylic acid, polyvinylpyrrolidone, styrene-maleic anhydride or ethylene-maleic anhydride copolymers and their derivatives or hydrophobically modified ethoxylated urethanes or polyacrylates; or photoinitiators, such as photoinitiators of the Norrish II type, whose mechanism of action is based on an intramolecular variant of the hydrogen abstraction reactions as occur diversely in the case of photochemical reactions; by way of example, reference may be made here to Römpp Chemie Lexikon, $9^{th}$, expanded and revised edition, Georg Thieme Verlag, Stuttgart, Vol. 4, 1991, or Römpp Lexikon Lacke und Druckfarben, Georg Thieme Verlag, Stuttgart, N.Y. 1998, "photo-initiators", pages 444 to 446.

Further examples of suitable coatings additives are described in the textbook "Lackadditive" [Additives for coatings] by Johan Bieleman, Wiley-VCH, Weinheim, N.Y., 1998.

Viewed in terms of its method, the preparation of the composition of the invention has no special features but instead takes place by the mixing of its constituents, in which context it is possible to employ primary or secondary dispersion methods and also customary and known mixing equipment such as stirred vessels, dissolvers, stirred mills, or extruders.

The compositions of the invention serve preferably to prepare the coating materials, adhesives, and sealing compounds of the invention, but especially the coating materials of the invention. In this application, the compositions of the invention exhibit very particular advantages. Thus they may be prepared at high concentration and can be stored without problems as concentrates, already including all of the constituents needed for their subsequent end use. They need only be adjusted with water and/or with at least one water-miscible organic solvent to the viscosity required for the respective application—and only in an amount just sufficient for the end use in question. Accordingly, the compositions of the invention are outstandingly suitable, in particular, for preparing very small amounts, as have to be provided, for example, for special colors in automotive OEM finishing or, generally, for automotive refinish. Here, the use of the compositions of the invention proves to be particularly advantageous both technically and economically.

In accordance with the invention it is of advantage to start from compositions of the invention curable physically, thermally, or thermally and with actinic radiation which contain water or are substantially free from water, and which are then diluted with water. In the context of the present invention, "substantially free from water" refers to a water content composed solely of the amounts introduced by way of the individual hydrous constituents.

In accordance with the invention it is also of advantage to start from compositions of the invention curable physically, thermally, or thermally and with actinic radiation which contain water, and which are then diluted with at least one organic solvent or a mixture of at least one solvent and water, to give conventional coating materials, adhesives and sealing compounds.

The resultant adhesives of the invention are used to produce the adhesive films of the invention on the primed and unprimed substrates described below.

The resultant sealing compounds of the invention are used to produce the seals of the invention on and in the primed and unprimed substrates described below.

The resultant coating materials of the invention are used to produce the coatings of the invention on the primed and unprimed substrates described below.

In this technological field, the compositions of the invention have very particular advantages and may be employed very widely. For instance, depending on their composition, the coating materials of the invention may be used as surfacers to produce surfacer coats or antistonechip primer coats, as basecoat materials, especially aqueous basecoat materials, to produce basecoats, as solid-color topcoat materials to produce solid-color topcoats, or as clearcoat materials to produce clearcoats. With particular preference, the coating materials of the invention are employed for the preparation of basecoat materials, especially aqueous basecoat materials, or solid-color topcoat materials.

The basecoat material of the invention, especially the aqueous basecoat material of the invention, is outstandingly suitable for the production of multicoat color and/or effect coating systems on primed and unprimed substrates by the wet-on-wet technique. Moreover, the solid-color topcoat material of the invention is outstandingly suitable for the production of single-coat color and/or effect coatings.

The coating material of the invention exhibits particular advantages in its use as an aqueous basecoat material as part of the wet-on-wet technique, wherein the aqueous basecoat material is applied to the primed or unprimed substrate and dried, but not cured, a clearcoat material is subsequently applied to the aqueous basecoat film, and the resulting clearcoat film is cured together with the aqueous basecoat film, thermally or thermally and with actinic radiation (dual cure).

Suitable substrates are all surfaces for coating which are not damaged by curing of the films present thereon using heat, or heat and actinic radiation in combination (dual cure); for example, metals, plastics, wood, ceramic, stone, textile, fiber assemblies, leather, glass, glass fibers, glass wool and rock wool, mineral-bound and resin-bound building materials, such as plasterboard and cement slabs or roof tiles, and composites of these materials. Accordingly, the multicoat systems of the invention are also suitable for applications outside those of automotive OEM finishing and automotive refinish as well. In this context they are particularly suitable for the coating of furniture and for industrial coating, including coil coating and container coating. In the context of industrial applications they are suitable for coating virtually all parts for private or industrial use, such as radiators, domestic appliances, small metal parts such as nuts and bolts, hub caps, wheel rims, or packaging.

In the case of electrically conductive substrates it is possible to use primers, which are prepared in a customary and known manner from electrodeposition coating materials. Both anodic and cathodic electrodeposition coating materials are suitable for this purpose, but especially cathodics. Normally, especially in the painting of automobiles, a surfacer coat or antistonechip primer coat, which may be regarded as part of the primer, is applied over the electrocoat.

It is also possible to coat, bond or seal parts of primed or unprimed plastics, for example, ABS, AMMA, ASA, CA, CAB, EP, UF, CF, MF, MPF, PF, PAN, PA, PE, HDPE, LDPE, LLDPE, UHMWPE, PC, PC/PBT, PC/PA, PET, PMMA, PP, PS, SB, PUR, PVC, RF, SAN, PBT, PPE, POM, PUR-RIM, SMC, BMC, PP-EPDM and UP (abbreviations to DIN 7728T1). In the case of unfunctionalized and/or nonpolar substrate surfaces, these may be subjected prior to coating in a known manner to a pretreatment, such as with a plasma or by flaming, or may be provided with a water-based primer.

The aqueous basecoat materials of the invention may be applied by any standard method, such as spraying, knifecoating, brushing, flowcoating, dipping, impregnating, trickling or rolling, for example. The substrate to be coated may itself be at rest, with the application device or unit being moved. Alternatively, the substrate to be coated, especially a coil, may be moved, with the application unit being at rest relative to the substrate or being moved appropriately. Where the aqueous basecoat materials of the invention include constituents which can be activated with actinic radiation, application is conducted preferably in the absence of light. These application methods may of course also be used for the application of the clearcoat film as part of the wet-on-wet technique of the invention.

Possibly following a certain rest period, which is used for the films to flow out and/or for the volatile constituents to evaporate, the aqueous basecoat films and clearcoat films applied may be cured in a customary and known manner, thermally or thermally and with actinic radiation.

In terms of its method, the thermal curing has no special features; instead, the customary and known temperatures in the range from room temperature to 200° C., curing times in the range from one minute to three hours, and equipment such as radiant heaters or forced-air ovens are used.

The curing with actinic radiation also has no special features in terms of its method, but instead takes place in a customary and known manner by irradiation with UV lamps and/or electron beam sources, preferably under inert gas.

In the case of conjoint curing of the dual-cure aqueous basecoat films of the invention with the clearcoat films, thermal curing and actinic radiation curing may be employed simultaneously or in alternation. Where the two curing methods are used in alternation, it is possible, for example, to commence with thermal curing and to end with actinic radiation curing. In other cases it may prove advantageous to commence and to end with actinic radiation curing. The skilled worker is able to determine the curing method most advantageous for the case in hand on the basis of his or her general knowledge in the art, with or without the assistance of simple preliminary tests.

In this context it is found to be a further particular advantage of the aqueous basecoat material of the invention that, in the context of the wet-on-wet technique, all customary and known clearcoat materials, as well as the clearcoat materials of the invention, may be combined with the aqueous basecoat film of the invention.

Examples of suitable known one-component (1K), two-component (2K) or multicomponent (3K, 4K) clearcoat materials are known from the patents DE-A-42 04 518, U.S. Pat. Nos. 5,474,811, 5,356,669, 5,605,965, WO 94/10211, WO 94/10212, WO 94/10213, EP-A-0 594 068, EP-A-0 594 071, EP-A-0 594 142, EP-A-0 604 992, WO 94/22969, EP-A-0 596 460 and WO 92/22615.

One-component (1K) clearcoat materials comprise, as is known, hydroxyl-containing binders and crosslinking agents such as blocked polyisocyanates, tris(alkoxycarbonylamino) triazines and/or amino resins. In a further variant they comprise polymers containing lateral carbamate and/or allophanate groups as binders and amino resins modified with carbamate and/or with allophanate as crosslinking agents (cf. U.S. Pat. No. 5,474,811, 5,356,669, 5,605,965, WO 94/10211, WO 94/10212, WO 94/10213, EP-A-0 594 068, EP-A-0 594 071 or EP-A-0 594 142).

Two-component (2K) or multicomponent (3K, 4K) clearcoat materials comprise as their key constituents, as is known, hydroxyl-containing binders and polyisocyanate crosslinking agents, which are stored separately until they are used.

Examples of suitable powder clearcoat materials are known, for example, from the German patent DE-A-42 22 194 or from the BASF Lacke+Farben AG product information bulletin "Pulverlacke" [powder coating materials], 1990.

The key constituents of powder clearcoat materials are, as is known, binders containing epoxide groups, and polycarboxylic acids as crosslinking agents.

Examples of suitable powder slurry clearcoat materials are known, for example, from the U.S. Pat. No. 4,268,542 and from the German patent applications DE-A-195 18 392.4 and DE-A-196 13 547, or are described in the German patent application DE-A-198 14 471.7, unpublished at the priority date of the patent specification.

Powder slurry clearcoat materials, as is known, comprise powder clearcoat materials dispersed in an aqueous medium.

UV-curable clearcoat materials are disclosed, for example, in the patents EP-A-0 540 884, EP-A-0 568 967, and U.S. Pat. No. 4,675,234.

Within the multicoat system of the invention, the thickness of the individual coats may vary widely. In accordance with the invention, however, it is of advantage for the aqueous basecoat film to have a thickness of from 5 to 25 $\mu$m, in particular from 7 to 20 $\mu$m, and for the clearcoat film to have a thickness of from 15 to 120 $\mu$m, preferably from 40 to 80 $\mu$m, and in particular from 60 to 70 $\mu$m.

The single-coat and multicoat systems of the invention have outstanding optical, mechanical, and chemical properties. For instance, they are free from any surface defects such as shrinkage (wrinkling). Moreover, they possess particularly high hiding power, outstanding intercoat adhesion, and outstanding optical effects, especially metallic effects.

Overall, the primed and unprimed substrates coated with a coating of the invention, bonded with an adhesive film of the invention, and/or sealed with a sealing compound of the invention have a particularly outstanding properties profile, especially particularly long service life, which makes them particularly attractive, both technically and economically, to the user.

EXAMPLES

Examples 1 to 4

The Preparation of Thermally Curable Inventive Compositions and Coating Materials For Examples 1 to 4, the following constituents were provided or prepared:

1. Polyurethane Dispersion A

The polyurethane dispersion A was prepared in accordance with the instructions specified in the German patent DE-A-44 37 535 on page 7 lines 21 to 34, "B preparation of an aqueous polyurethane dispersion", from 248.82 parts by weight of a polyester diol, prepared from 1.81 mol of a dimeric fatty acid (Pripol® 1009 from Unichema; dimer content at least 98% by weight, trimer content not more than 2% by weight, monomer content not more than traces), 0.82 mol of isophthalic acid, 0.61 mol of hexanediol, and 0.61 mol of neopentyl glycol, 2.64 parts by weight of neopentyl glycol, 15.27 parts by weight of dimethylolpropionic acid, 77.07 parts by weight of m-tetramethylxylylene diisocyanate, 13.16 parts by weight of trimethylol-propane, and 8.41 parts by weight of dimethylethanol-amine, and was adjusted to a solids content of 31% by weight.

2. Secondary Aqueous Acrylic Dispersion A

The secondary aqueous acrylic dispersion A was prepared exactly as described in the German patent DE-A-44 37 535 on page 8 lines 25 to 49, "E preparation of an aqueous polyacrylate dispersion". The solids content of the dispersion was 40% by weight.

3. Aqueous Solution of a Polyester A

The aqueous solution of a polyester A was prepared in analogy to the instructions specified in the German patent DE-A-44 37 535 on page 7 lines 6 to 19, "preparation of an aqueous polyester resin solution", from 97.8 parts by weight of neopentyl glycol, 62 parts by weight of hexahydrophthalic anhydride, 229 parts by weight of dimeric fatty acid Pripol® 1009, 111 parts by weight of hexanediol, 102.9 parts by weight of trimellitic anhydride, and 2.3 parts by weight of dimethylethanolamine, using 20 parts by weight of xylene, (entrainer) and 20 parts by weight of butyl Cellosolve (cosolvent), and was adjusted with water to a solids content of 60% by weight.

4. Aqueous Solution of a Polyester B

The aqueous solution of a polyester A was prepared in accordance with the instructions specified in the German patent DE-A-44 37 535 on page 7 lines 6 to 19, "preparation of an aqueous polyester resin solution". Instead of the 158 parts by weight of dimethylethanolamine specified therein, however, 16.2 parts by weight of dimethylethanolamine were used.

5. Flatting Paste (White-gray)

The flatting paste was prepared by mixing 30 parts by weight of the polyester solution B from section 4, 46 parts by weight of butyl glycol, 12 parts by weight of a 10% strength solution of dimethyl-ethanolamine in water, and 12 parts by weight of a commercial pyrogenic silica (Syloid® ED 3).

6. Aqueous Tinting Paste (White)

The aqueous tinting paste was prepared by mixing 63.7 parts by weight of the above-described polyurethane dispersion A (cf. section 1), 2.7 parts by weight of deionized water, 32 parts by weight of a commercial titanium dioxide pigment of the rutile type (Titan® UV L 530), 0.3 parts by weight of a commercial pyrogenic silica (Aerosil® R 972) and 1.3 parts by weight of a 10% strength solution of dimethylethanol-amine in water.

7. Aqueous Tinting Paste (Colorless, Transparent)

The aqueous tinting paste was prepared by mixing 62.9 parts by weight of the above-described polyurethane dispersion A (cf. section 1), 2.0 parts by weight of a commercial polyetherpolyol (Pluriol® P 900) 0.9 parts by weight of Aerosil® R972, 30 parts by weight of a commercial titanium dioxide pigment of the rutile type (Titan Rutil Tayca® MT500 HD), 3.8 parts by weight of deionized water and 0.4 part by weight of a 10% strength solution of dimethylethanolamine in water.

8. Metallic Pigment

65% suspension of aluminum flakes (Alu-Stapa Hydrolux® 2192 from Eckart).

9. Crosslinking Agent 9.1 Commercial Melamine Resin Solution (72% Strength) (Cymel® 203)
9.2 Commercial Melamine Resin (99.9% Strength) (Cymel® 1133)

10. Wetting Agent

Commercial wetting agent (Byk® 345 from Byk Chemie).

11. Compound I for Inventive Use (Urea Urethane)

Commercial Theological additive (Byk® 410 from Byk Chemie; 52% strength in N-methylpyrrolidone).

12. Polyurethane Dispersion B

The polyurethane dispersion B was prepared in accordance with the instructions specified in the German patent DE 43 39 870 A1 in column 11, line 47 to column 12 line 20, "1. Preparation of an inventive binder dispersion".

13. Wax Paste

6% dispersion of an acrylic copolymer wax in butyl acetate/xylene.

Examples 1 to 3

The Preparation of an Inventive Composition and the Preparation of an Inventive Aqueous Basecoat Material (Example 1) and of Conventional Basecoat Materials (Examples 2 and 3) Therefrom The composition of the invention was prepared by mixing the following constituents, described above, in the stated amounts:

21.0 parts by weight of constituent 1,
5.0 parts by weight of constituent 2,
4.0 parts by weight of constituent 3,
1.6 parts by weight of constituent 5,
3.9 parts by weight of constituent 6,
0.9 part by weight of constituent 7,
5.0 parts by weight of constituent 8,
4.5 parts by weight of constituent 9.1,
0.1 part by weight of constituent 10,
5.0 parts by weight of constituent 11,
5.0 parts by weight of isopropanol, and
6.0 parts by weight of butyl glycol.

The resulting inventive composition was completely stable on storage. In particular, there was no change in its viscosity.

For Example 1, the inventive composition was diluted with 38 parts by weight of deionized water, with stirring. This gave an aqueous basecoat material (solids content: 20.87% by weight) of satin silver color, which was likewise entirely stable on storage and which together with a very wide variety of clearcoat materials gave outstanding multicoat color and/or effect coating systems.

For Example 2, the inventive composition was diluted with 38 parts by weight of isopropanol. This gave a conventional basecoat material (solids content: 20.87% by weight) of satin silver color, which was likewise entirely stable on storage and which together with a very wide variety of clearcoat materials gave outstanding multicoat color and/or effect coating systems.

For Example 3, the conventional basecoat material of Example 2 was diluted further with 32.5 parts by weight of butyl acetate and 7.5 parts by weight of butyl diglycol acetate. This gave a dilute conventional basecoat material (solids content: 14.91% by weight) of satin silver color, which was likewise entirely stable on storage and which together with a very wide variety of clearcoat materials gave outstanding multicoat color and/or effect coating systems.

Example 4

The Preparation of an Inventive Composition and of a Dilute Conventional Inventive Basecoat Material Therefrom The composition of the invention was prepared by mixing the following constituents, described above, in the stated amounts:

21.33 parts by weight of constituent 12,
1.07 parts by weight of constituent 5,
2.6 parts by weight of constituent 6,
0.6 part by weight of constituent 7,
4.0 parts by weight of constituent 9.2
3.33 parts by weight of constituent 11,
3.33 parts by weight of constituent 8,
0.04 parts by weight of constituent 10,
7.29 parts by weight of constituent 13,
26.4 parts by weight of isopropanol, and
4.0 parts by weight of butyl glycol.

The resulting inventive composition which in terms of its nature was conventional, i.e., containing predominantly organic solvents, was completely stable on storage. In particular, there was no change in its viscosity.

The inventive composition was diluted with 8.67 parts by weight of solvent naphtha, 8.67 parts by weight of butyl acetate, and 8.67 parts by weight of butyl glycol with stirring. This gave a dilute conventional basecoat material (solids content: 17.81% by weight) of satin silver color, which was likewise entirely stable on storage and which together with a very wide variety of clearcoat materials gave outstanding multicoat color and effect coating systems.

(I-1)
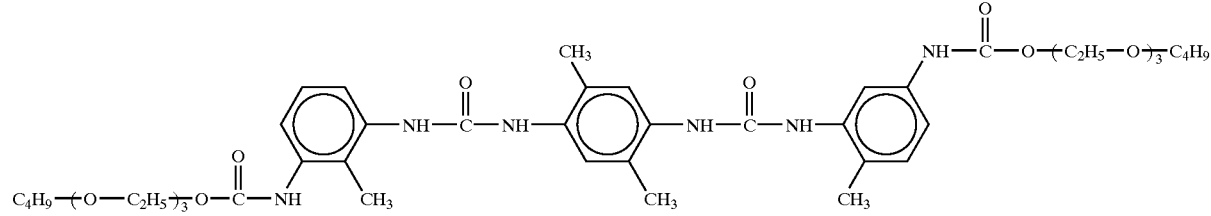

(I-2)
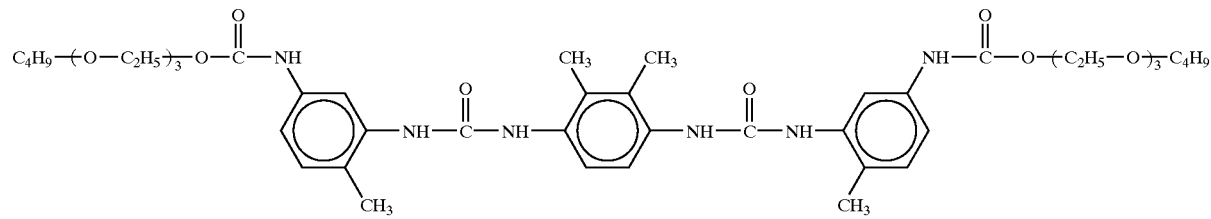

(I-3)
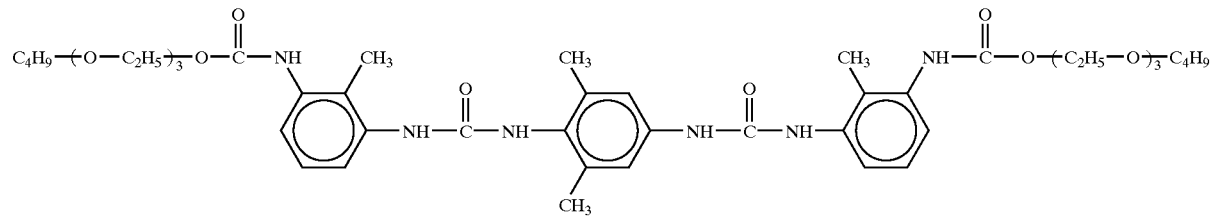

(I-4)
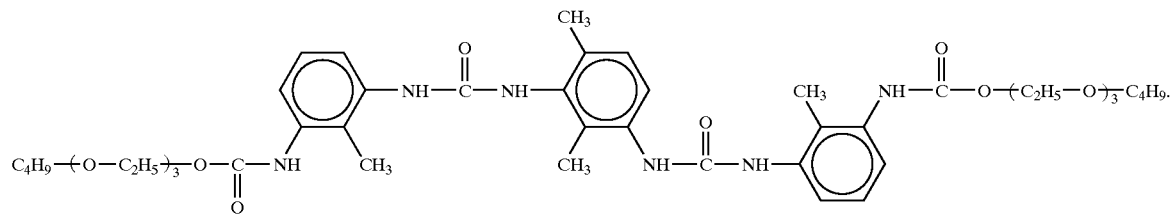

What is claimed is:

1. An aqueous composition curable physically, thermally, and/or with actinic radiation, comprising at least one compound containing urea and urethane groups and of the general formula I:

$$X[NH—C(=O)—NH—Y—NH—C(=O)—OR]_2 \quad (I)$$

in which the variable have the following definition:
R denotes identical or different poly(alkylene ether) radicals;
X denotes divalent substituted or unsubstituted arylene radical, wherein X is not a substituted or an unsubstituted methane diphenylene radical;
Y denotes identical divalent, substituted or unsubstituted arylene radicals identical to or different from the radical X, wherein Y is not a tol-2,4-ylene radical, a tol-2,6-ylene radical, or an unsubstituted methane diphenylene radical.

2. The composition as claimed in claim 1, comprising the compound I in an amount, based on the composition, of from 0.1 to 10% by weight.

3. The composition of claim 1, wherein the polyalkylene glycol ether radicals R have the general formula II:

$$—(—R^1—O—)_n—R^2 \quad (II),$$

in which the index and the variables have the following definition:
n=2 to 10;
$R^1$=alkanedlyl radical having 2 to 4 carbon atoms; and
$R^2$=alkyl radical having 1 to 6 carbon atoms or cycloalkyl radical having 4 to 7 carbon atoms.

4. The composition of claim 1, wherein substituted and/or unsubstituted phenylene, naphthylene, biphenylylene and/or alkanediphenylylene radicals are used as radical X and Y.

5. The composition as claimed in claim 4, wherein alkyl-substituted phenylene radicals X and Y.

6. A process for preparing an aqueous coating material, adhesive, or sealing compound, which comprises
(1) preparing an aqueous or anhydrous composition curable physically, thermally, or thermally and with actinic radiation and comprising at least one compound, containing urea and urethane groups, of the general formula I:

$$X[NH—C(=O)—NH—Y—NH—C(=O)—OR]_2 \quad (I),$$

in which the variables have the following definition:
R denotes identical or different poly(alkylene ether) radicals:
X denotes divalent substituted or unsubstituted arylene radical, wherein X is not a substituted or an unsubstituted methane diphenylene radical;
Y denotes identical divalent, substituted or unsubstituted arylene radicals, or which none or one is identical to the radical X,
wherein Y is not a tol-2,4-ylene radical, a tol-2,6-ylene radical, or an unsubstituted methane diphenylene radical;
from its constituents by mixing, and
(2) diluting the resulting composition with at least one material selected from water, an organic solvent, and mixtures thereof.

7. An aqueous composition curable physically, thermally, and/or with actinic radiation, comprising at least one compound containing urea and urethane groups and of the general formula I:

$$X[NH—C(=O)—NH—Y—NH—C(=O)—OR]_2 \quad (I)$$

in which the variable have the following definition:
R denotes identical or different poly(alkylene ether) radicals;
X denotes a xylene radical,
Y denotes divalent, substituted or unsubstituted arylene radicals identical to or different from the radical X,
wherein Y is not a tol-2,4-ylene radical, a tol-2,6-ylone radical, or an unsubstituted methane diphenylene radical when X is a substituted or an unsubstituted methane diphenylene radical.

8. The process of claim 6, wherein the compound I is present in the composition (1) in an amount, based on the composition, of from 0.1 to 10% by weight.

9. The process of claim 6, wherein the polyalkylene glycol ether radicals R have the general formula II:

$$—(—R^1—O—)_n—R^2 \quad (II),$$

in which the index and the variables have the following definition:
n=2 to 10;
$R^1$=alkanediyl radical having 2 to 4 carbon atoms; and
$R^2$=alkyl radical having 1 to 6 carbon atoms or cycloalkyl radical having 4 to 7 carbon atoms.

10. The process of claim 6, wherein substituted and/or unsubstituted phenylene, naphthylene, biphenylylene and/or alkanediphenylylene radicals are used as radicals X and Y.

11. The process as claimed in claim 10, wherein alkyl-substituted phenylene radicals are used as radicals X and Y.

12. The aqueous coating material, adhesive, or sealing compound, prepared from the composition of claim 1.

13. A coating, adhesive film, or seal on and/or in a primed or unprimed substrate, obtained by the use of the aqueous coating material, adhesive, or sealing compound of claim 12.

14. A process for preparing an aqueous coating material, adhesive, or sealing compound, which comprises
(1) preparing an aqueous or anhydrous composition curable physically, thermally, or thermally and with actinic radiation and comprising at least one compound, containing urea and urethane groups, of the general formula I:

$$X[NH—C(=O)—NH—Y—NH—C(=O)—OR]_2 \quad (I)$$

in which the variables have the following definition:
R denotes identical or different poly(alkylene ether) radicals:
X denotes a xylene radical;
Y denotes a divalent, substituted or unsubstituted arylene radicals of which one or none is identical to the radical X,
wherein Y is not a tol-2,4-ylene radical, a tol-2,6-ylene radical, or an unsubstituted methane diphenylene radical when X is a substituted or an unsubstituted methane diphenylene radical;
from its constituents by mixing, and
(2) diluting the resulting composition with at least one material selected from water, an organic solvent, and mixtures thereof.

15. The aqueous coating material, adhesive, or sealing compound, prepared with a composition prepared by the process of claim 6.

16. The aqueous coating material of claim 1, wherein at least one of X or Y is selected from the group consisting of a phen-1,2-ylene radical, a phen-1,3-ylene radical, a phen-1,4-ylene radical, a naphth-1,2-ylene radical, a naphth-1,3-ylene radical, a naphth-1,4-ylene radical, a naphth-1,5-ylene radical, a naphth-1,6-ylene radical, a naphth-1,7-ylene radical, a naphth-1,8-ylene radical, a naphth-2,3-ylene radical, a biphenyl-4,3'-ylene radical, a biphenyl4,2'-ylene radical, a biphenyl-3,3'-ylene radical, a biphenyl-2,2'-ylene radical, a methanediphenyl-4,3'-yelene radical, a methanediphenyl-4,2'-yelene radical, a methanediphenyl-3,3'-yelene radical, a methanediphenyl-2,3-yelene radical, an ethane-1,1-diphenyl-4,4'-ylene radical, an ethane-1,1-diphenyl-4,3'-radical, an ethane-1,1-diphenyl-4,2'-radical, and ethane-1,1-diphenyl-3,3'-radical, an ethane-1,1-diphenyl-2,2'-ylene radical, a propane-2,2-diphenyl-4,4'-ylene radical, a propane-2,2-diphenyl-4,3'-ylene radical, a propane-2,2-diphenyl-4,2'-ylene radical, a propane-2,2-diphenyl-3,3'-ylene radical, a propane-2,.2-diphenyl-2,2'-ylene radical, a tol-2,3-ylene radical, a tol-2,5-ylene radical, a tol-3,4-ylene radical, a tol-3,5-ylene radical, an o-xyl-3,4-ylene radical, an o-xyl-3,5-ylene radical, an o-xyl-3,6-ylene radical, a m-xyl-2,4-ylene radical, a m-xyl-2,5-ylene radical, a p-xyl-2,3-ylene radical, a p-xyl-2,5-ylene radical, a p-xyl-2,6-ylene radical, a 1,3,4-trimethylphen-1,4-ylene radical, a 1,2,4-trimethylphen-3,5-ylene radical, a 1,2,4 trimethylphen-3,8-ylene radical, a 1,2,4-trimethylphen-5,6-ylene radical, a 1,2,3-trimethylphen-4,5-ylene, radical, a 1,2,3-trimethylphen-4,6-ylene radical, and combinations thereof.

17. The aqueous composition of claim 1, wherein a substituent for the substituted arylene radical is selected from the group consisting of halogen atoms, nitrile groups, nitro groups, alkyl radicals, cycloalkyl radicals, alkylcycloalkyl radicals, cycloalkylalkyl radicals, aryl radicals, alkylaryl radicals, cycloalkylaryl radicals, arylalkyl radicals, arylcycloalkyl radicals, at least partially halogenated alkyl radicals, at least partially halogenated cycloalkyl radicals, at least partially halogenated alkylcycloalkyl radicals, at least partially halogenated cycloalkylalkyl radicals, at least partially halogenated aryl radicals, at least partially halogenated alkylaryl radicals, at least partially halogenated cycloalkylaryl radicals, at least partially halogenated arylalkyl radicals, at least partially halogenated arylcycloalkyl radicals, aryloxy radicals, alkyloxy radicals, cyoloalkyloxy radicals, arylthio radicals, alkylthio radicals, cycloalkylthio radicals, tertiary amino groups, and combinations thereof.

18. The aqueous composition of claim 7, wherein the at least one compound containing urea and urethane groups is at least one of:

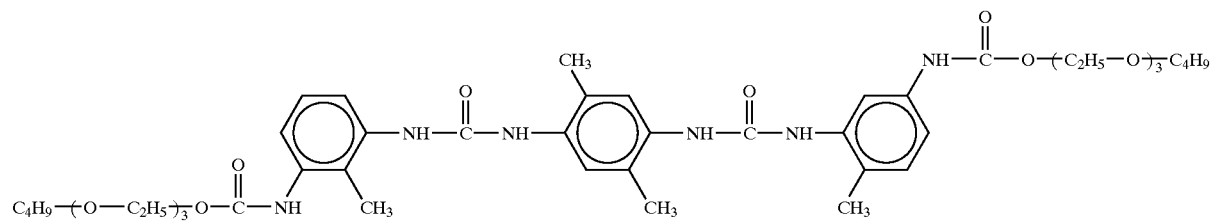

(I-1)

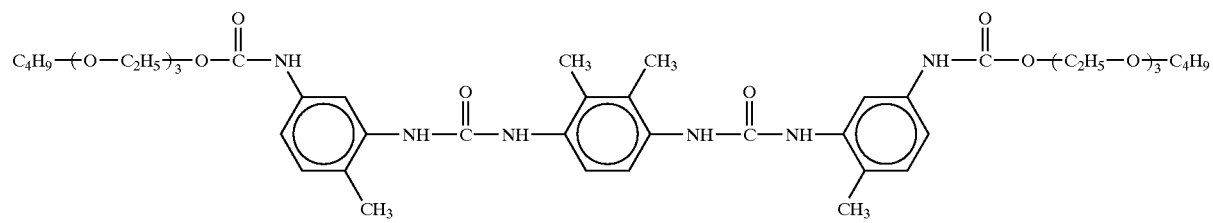

(I-2)

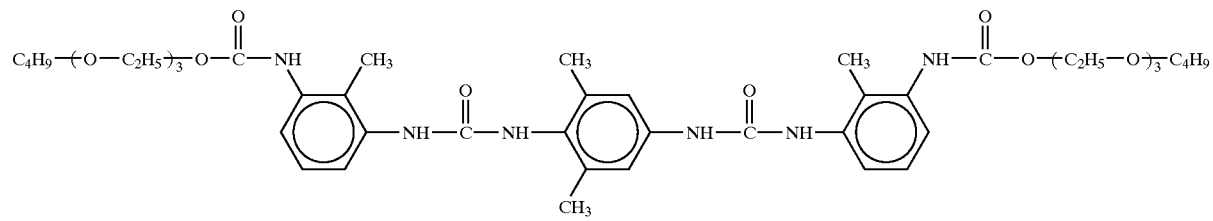

(I-3)

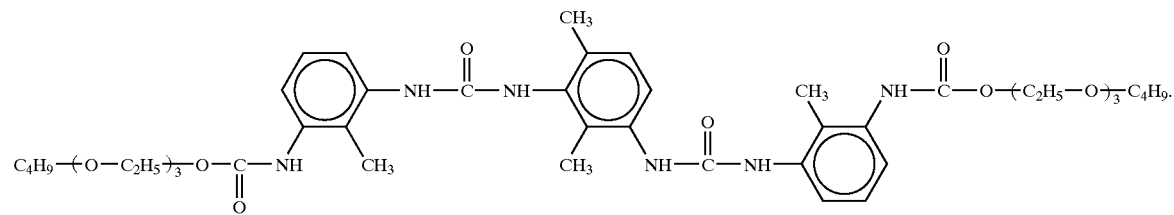

(I-4)

19. The process of claim 6, wherein at least one of X or Y is selected from the group consisting of a phen-1,2-ylene radical, a phen-1,3-ylene radical, a phen-1,4-ylene radical, a naphth-1,2-ylene radical, a naphth-13-ylene radical, a naphth-1,4-ylene radical, a naphth-1,5-ylene radical, a naphth-1,6-ylene radical, a naphth-1,7-ylene radical, a naphth-1,8-ylene radical, a naphth-2,3-ylene radical, a biphenyl-3,3'-ylene radical, a biphenyl-2,2'-ylene radical, a methanediphenyl-4,3'-yelene radical, a methanediphenyl-4,2'-yelene radical, a methanediphenyl-3,3'-yelene radical, a methanediphenyl-2,2-yelene, an ethane-1,1-diphenyl-4,4-ylene radical, an ethane-1,1-diphenyl-4,3'-radical, an ethane-1,1-diphenyl-4,2'-radical, an ethane-1,1-diphenyl-3,3'-radical, an ethane-1,1-diphenyl-2,2'-ylene radical, a propane-2,2-diphenyl-4,4'-ylene radical, a propane-2,2-diphenyl-4,3'-ylene radical, a propane-2,2-diphenyl-4,2'-ylene radical, a propane-2,2-diphenyl-3,3'-ylene radical, a propane-2,2-diphenyl-2,2'-ylene radical, a tol-2,3-ylene radical, a tol-2,5-ylene radical, a tol-3,4-ylene radical, a tol-3,5-ylene radical, an o-xyl-3,4-ylene radical, an o-xyl-3,5-ylene radical, an o-xyl-3,6-ylene radical, a m-xyl-2,4-ylene radical, a m-xyl-2,5-ylene radical, a p-xyl-2,3-ylene radical, a p-xyl-2,5-ylene radical, a p-xyl-2,6-ylene radical, a 1,3,4-trimethylphen-1,4-ylene radical, a 1,2,4-trimethylphen-3,5-ylene radical, a 1,2,4-trimethylphen-3,6-ylene radical, a 1,2,4-trimethylphen-5,6-ylene radical, a 1,2,3-trimethylphen-4,5-ylene radical, a 1,2,3-trimethylphen4,6-ylene radical, and combinations thereof.

20. The process of claim 6, wherein a substituent for the substituted arylene radical is selected from the group consisting of halogen atoms, nitrile groups, nitro groups, alkyl radicals, cycloalkyl radicals, alkylcycloalkyl radicals, cycloalkylalkyl radicals, aryl radicals, alkylaryl radicals, cycloalkylaryl radicals, arylalkyl radicals, arylcycloalkyl radicals, at least partially halogenated alkyl radicals, at least partially halogenated cycloalkyl radicals, at least partially halogenated alkylcycloalkyl radical, at least partially halogenated cycloalkylalkyl radicals, at least partially halogenated aryl radicals, at least partially halogenated alkylaryl radicals, at least partially halogenated cycloalkylaryl radicals, at least partially halogenated arylalkyl radicals, at least partially halogenated arylcycloalkyl radicals, aryloxy radicals, alkyloxy radicals, cycloalkyloxy radicals, arylthio radicals, alkythio radicals, cycloalkylthio radicals, tertiary amino groups, and combinations thereof.

21. the process of claim 14, wherein the at least one compound containing urea and urethane groups is at least one of: